April 28, 1959   J. NEUKIRCH   2,883,882
VARIABLE SPEED TRANSMISSION
Filed Sept. 15, 1953   7 Sheets-Sheet 3

INVENTOR.
Johannes Neukirch
BY Jones, Tesch + Danby
Attys.

April 28, 1959     J. NEUKIRCH     2,883,882
VARIABLE SPEED TRANSMISSION
Filed Sept. 15, 1953     7 Sheets-Sheet 4

INVENTOR.
Johannes Neukirch
BY
Jones, Tesch & Darbo
Att'ys.

April 28, 1959  J. NEUKIRCH  2,883,882
VARIABLE SPEED TRANSMISSION
Filed Sept. 15, 1953  7 Sheets-Sheet 5

INVENTOR.
Johannes Neukirch
BY
Jones, Tesch and Darby
Attys.

April 28, 1959     J. NEUKIRCH     2,883,882
VARIABLE SPEED TRANSMISSION
Filed Sept. 15, 1953     7 Sheets-Sheet 6
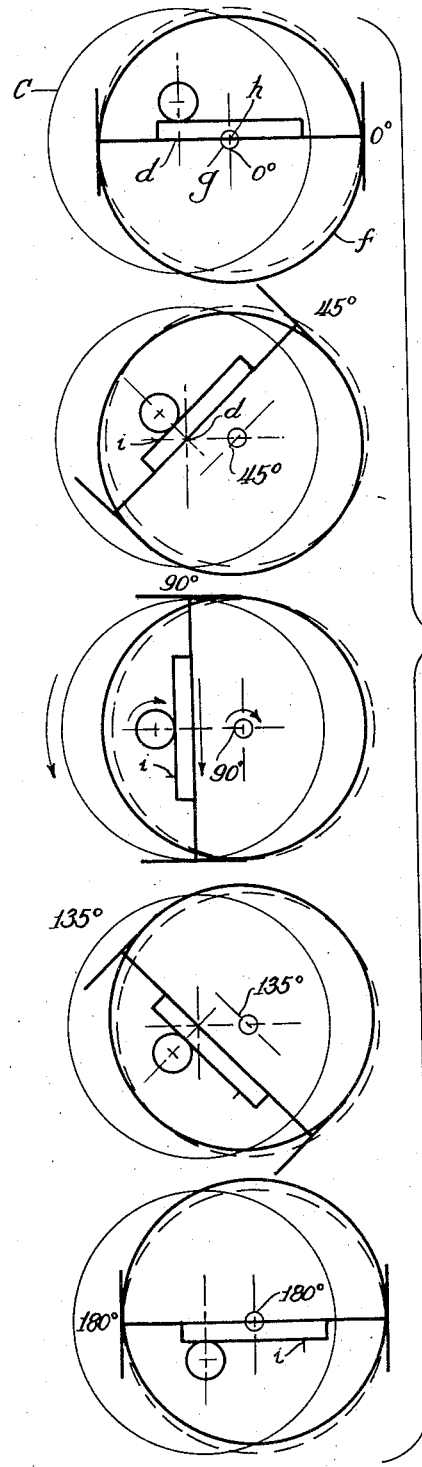
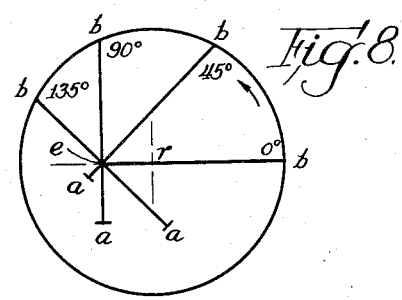
Fig. 8.
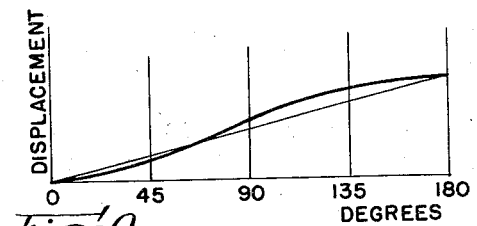
Fig. 9.
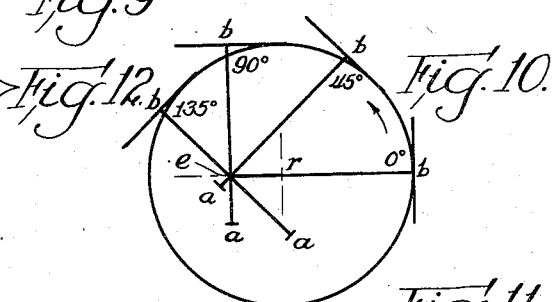
Fig. 12.  Fig. 10.
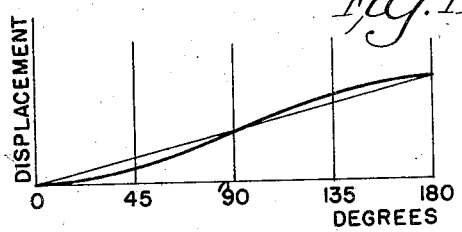
Fig. 11.
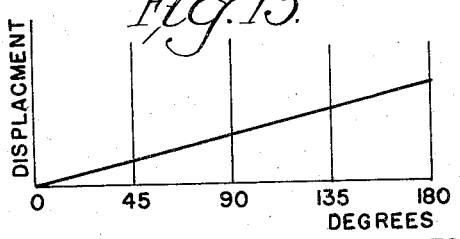
Fig. 13.
INVENTOR.
Johannes Neukirch
BY Jones, Tesch & Darbo
ATTORNEYS.

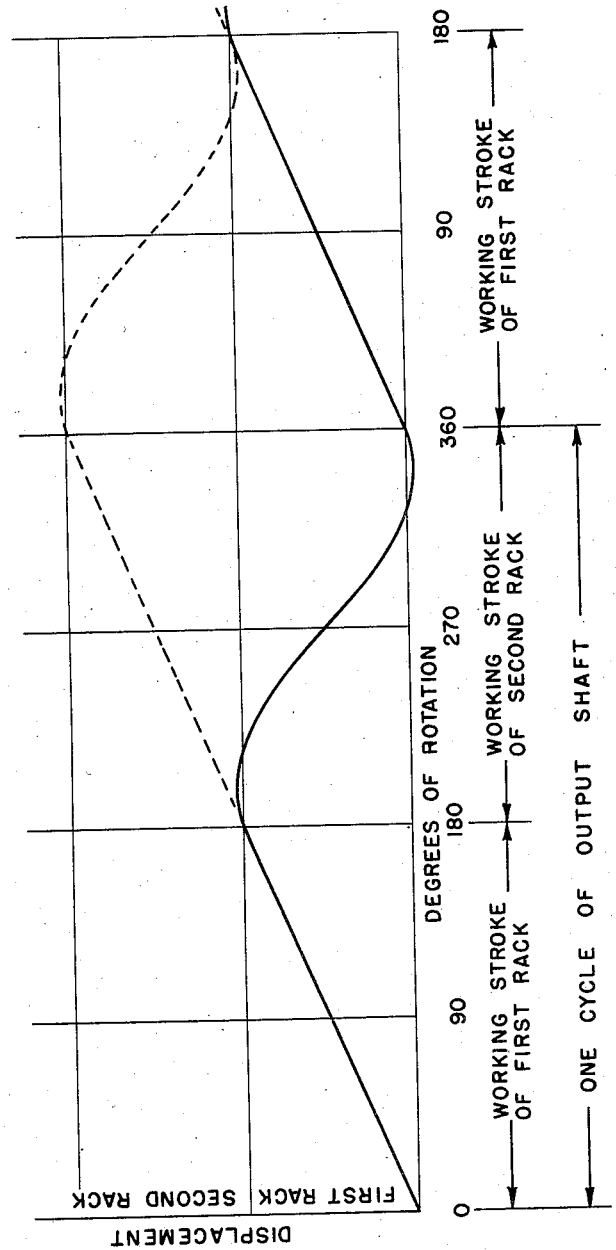

2,883,882

VARIABLE SPEED TRANSMISSION

Johannes Neukirch, Bad Durkheim-Pfalz, Germany, assignor of one-half to Frank Neukirch, Park Ridge, Ill.

Application September 15, 1953, Serial No. 380,201

Claims priority, application Germany September 30, 1952

19 Claims. (Cl. 74—679)

This invention relates to a variable speed mechanical transmission, and more particularly to a gear transmission employing a planetary gear system and provided with a mechanism which drives the planet pinions at a uniform speed whereby rotation of the output shaft at the desired speed relative to that of the input shaft is substantially uniform.

In one type of such a transmission, rotation of the planet pinions is imparted by racks which reciprocate in radial guides as they rotate with the drive shaft assembly, reciprocation of the racks being brought about by a fixed guideway or cam which imparts a reciprocating motion, asymmetric in nature, to the racks. Such mechanisms result in uneven speed of the driven shaft with resulting vibration and undue wear of the machine elements.

The object of the present invention is to provide a gear transmission comprising a continuously positively engaged gear train wherein the ratio of the speed of the driven or output shaft to that of the drive or input shaft may be steplessly varied and the rotation of the output shaft is uniform at any selected speed ratio. A further object is to provide such a transmission which is simple in construction and highly efficient in the transmission of power.

A particular feature of the invention resides in the self-adjusting dynamic camming mechanism which drives each of two planet pinion drive racks with uniform velocity over 180 degrees of rotation of the drive system regardless of the speed ratio at which the transmission is operating, with the result that the output shaft is continuously positively driven with substantially uniform torque. A further feature resides in the movement of the drive racks at the half-cycle transition points; i.e., at the end of each half turn of the input shaft, the momentary uniform and unidirectional movement of the racks resulting in smooth take-over from one rack to the other.

According to the invention, the dynamic camming mechanism is formed by a pair of eccentric circular cam plates with axes parallel with that of the input shaft and which revolve as a body with the midpoint of their eccentricity describing a circular orbit about a center which is eccentric with respect to the input shaft. The cam plates revolve with the same speed as the input shaft but in the opposite direction. The motion of a pair of racks in reciprocation follows the cam path described by the revolving eccentric cam plate assembly as the racks themselves are rotated in the opposite direction, that is, the direction of rotation of the input shaft. This cam path is different for each different setting of the speed ratio control mechanism.

As will be pointed out in greater detail hereinafter, the eccentricity of the axis of rotation of the camming mechanism as a body with respect to the input shaft and the eccentricity of each plate of the camming mechanism with respect to the axis of rotation of the mechanism are interdependent, a ratio of approximately 1 to 5 being maintained during operation of the transmission at all speed ratios. At a speed ratio of unity, the eccentricities are both zero.

An example of a transmission embodying the invention is shown in the accompanying drawings, in which Fig. 1 is a cross-sectional view of the transmission assembly taken at the line 1—1 of Fig. 2;

Figure 1:
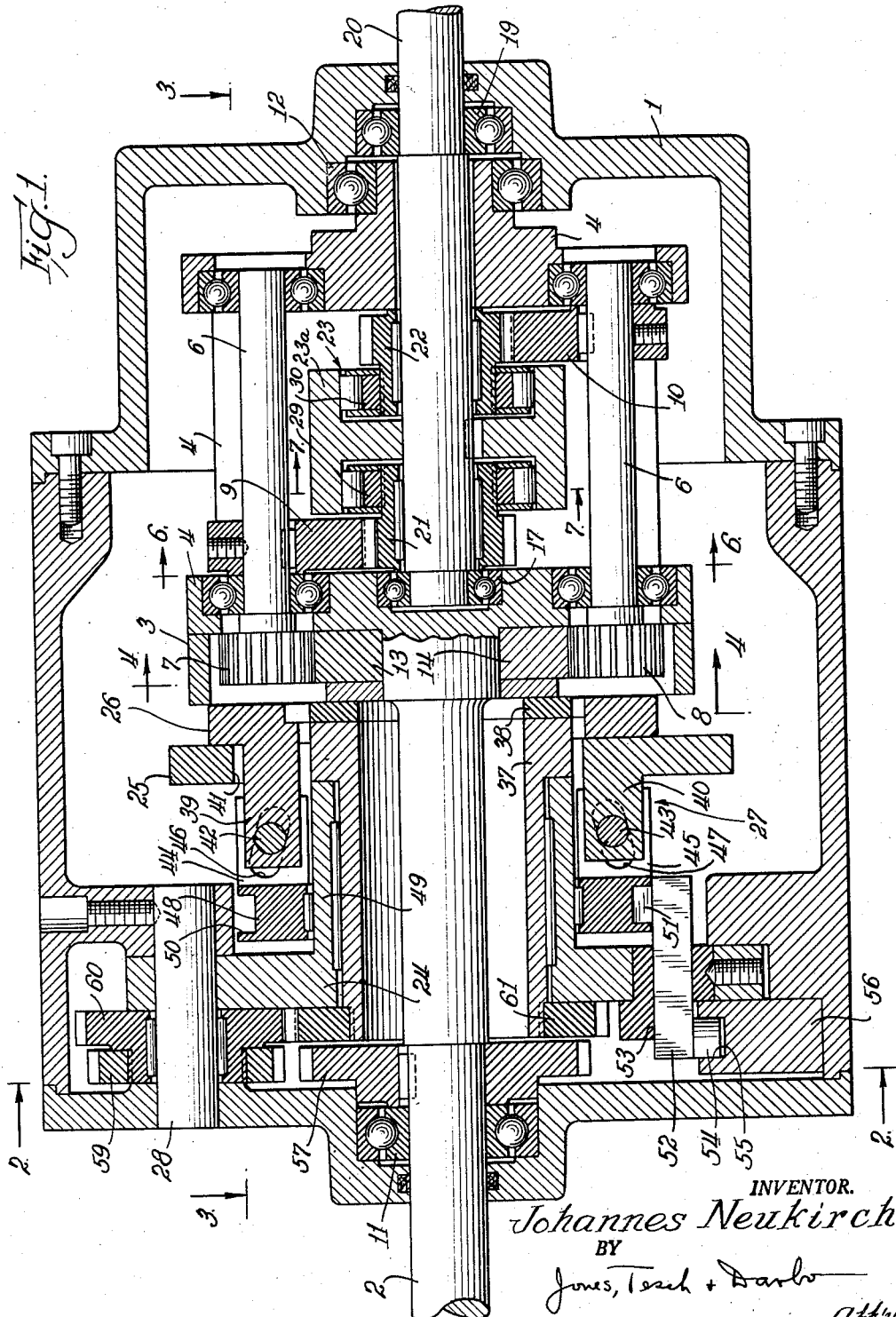
Figure 2:
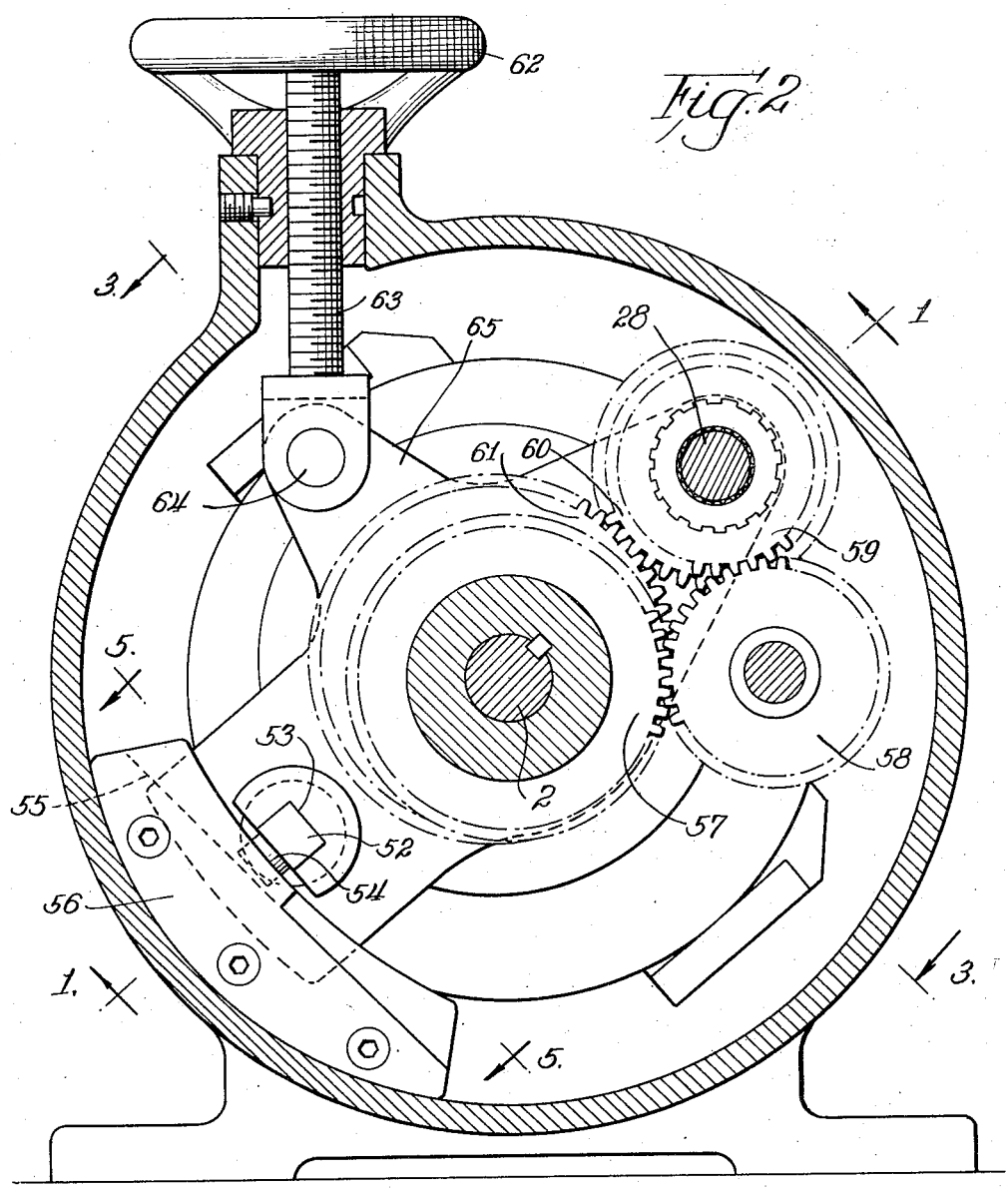
Fig. 2 is a vertical section taken at the line 2—2 of Fig. 1.
Figure 5:
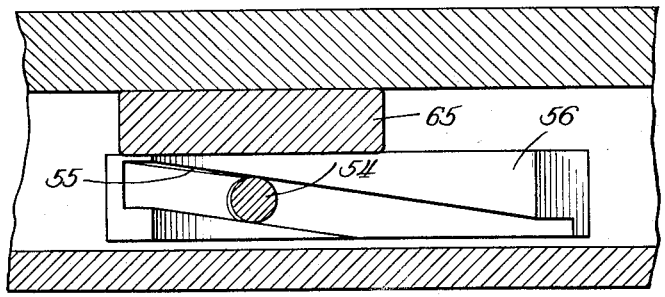
Figure 6:
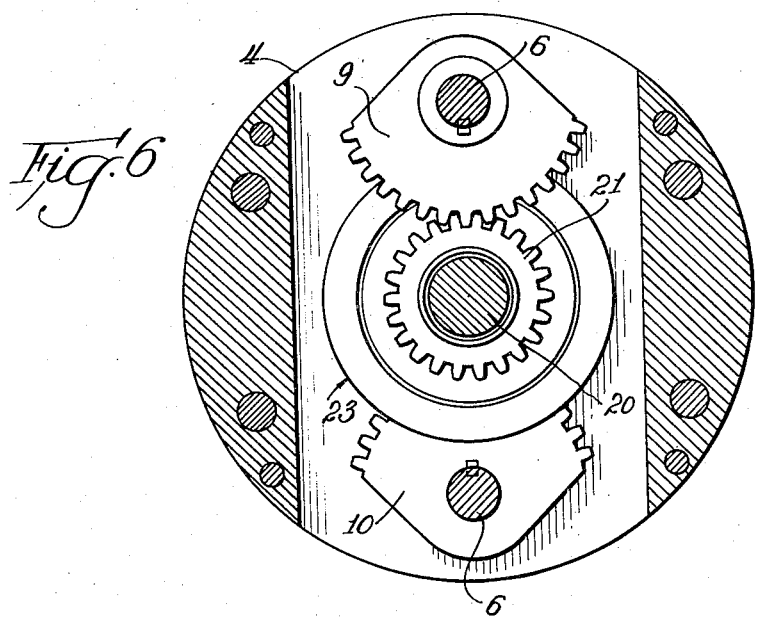
Figure 7:
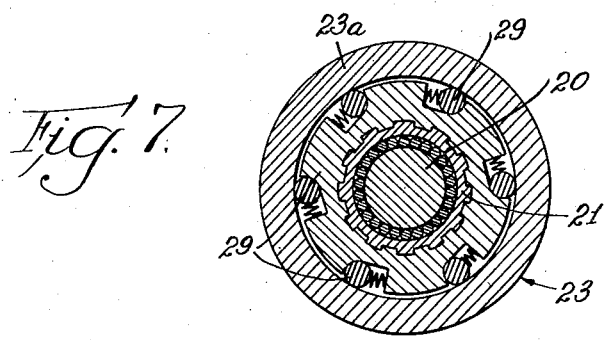

Figs. 5, 6, and 7 are detail views taken at the lines 5—5 of Fig. 2, and 6—6 and 7—7 of Fig. 1, respectively, and Figs. 8–14 are diagrammatic illustrations and graphs explanatory of the motion of the racks in the operation of the transmission of the invention.

To facilitate description and understanding of the transmission mechanism, it may be considered to comprise three sub-assemblies, all encased and mounted within a housing 1. The input shaft-planetary system assembly, including input shaft 2, rotor plate 3, pinion carrier 4 carrying planet gear shafts 5 and 6 to which are keyed pinions 7 and 8, and gear segments 9 and 10, is journaled at bearings 11 and 12 mounted in housing 1. Racks 13 and 14, meshing respectively with pinions 7 and 8, are fitted between the guide surfaces of a slideway 15 cut into rotor plate 3, and flats 16 on input shaft 2. The racks may be considered to be a part of the planet pinion driving mechanism described below. The input shaft-planetary system assembly rotates as a whole about the axis of input shaft 2.

The output shaft assembly is coaxial with the input shaft assembly just described, being journaled at bearing 17 in planet pinion carrier 4 and bearing 19 in housing 1, and includes output shaft 20, sun gears 21 and 22 journaled thereon and meshing with gear sectors 9 and 10, respectively, and a clutch assembly 23 adapted to couple the sun gears to the output shaft.

The planet pinion driving mechanism surrounds the input shaft between the drive (left, Fig. 1) end of transmission housing 1 and planet carrier 4. Its function is to drive pinions 7 and 8 in rotation about their own axes. The mechanism includes a sleeve 37 journaled within a collar-like flange 49 of bell crank 24 for rotation by a gear train in a direction opposite to that of the input shaft, and cam plates 25 and 26 which are constrained to rotate with sleeve 37 but are radially adjustable to vary their eccentricity with respect to sleeve 37 as controlled by a mechanism indicated at 27. The eccentricity of the axis of sleeve 37 with respect to the axis of input shaft 2 may also be varied by angular movement of bell crank 24 about a pivot shaft 28. It is important to note that angular displacement of bell crank 24, which carries most of the pinion gear drive mechanism, results in a change in the eccentricity of the axis of sleeve 37 with respect to the axis of input shaft 2 and also a change in the eccentricity of cam plates 25 and 26 with respect to the axis of sleeve 37, the relationship of these eccentricities being maintained at a constant value for any position of the bell crank. The speed ratio of the transmission is determined by the angular position of bell crank 24.

In the mechanism thus generally described, the input shaft-planetary system and the output shaft assemblies are known types of structures. The pinion carrier 4 is fixed to the inner end of input shaft 2 and thus rotates with it. This rotary motion is transmitted to output shaft 20 through gear sectors 9 and 10 meshing with sun gears 21 and 22, respectively, and clutches 29 and 30, including a collar 23a integral with, or keyed to, output shaft 20. In the absence of rotation of planet pinions 7 and 8 about their own axes, the speed of rotation of output shaft 20 is equal to that of input shaft 2.

In order to drive output shaft 20 at a speed other than that of input shaft 2, it is necessary to rotate the pinions 7 and 8 about their own axes to drive sun gears 21 and 22 at a speed which represents the sum of the rotation of the planetary gear system as a whole, as above described, and the rotation of planet shafts 6 carrying gears 9 and 10. Furthermore, rotation of the planet pinions must be uniform during the intermittent intervals when they are coupled in driving relation to driven shaft 20 by clutch mechanism 23. This is accomplished pursuant to the intervention by means of racks 13 and 14 meshing, respectively, with pinions 7 and 8, and the mechanism now to be described in detail for driving the racks in reciprocation.

Figure 3:
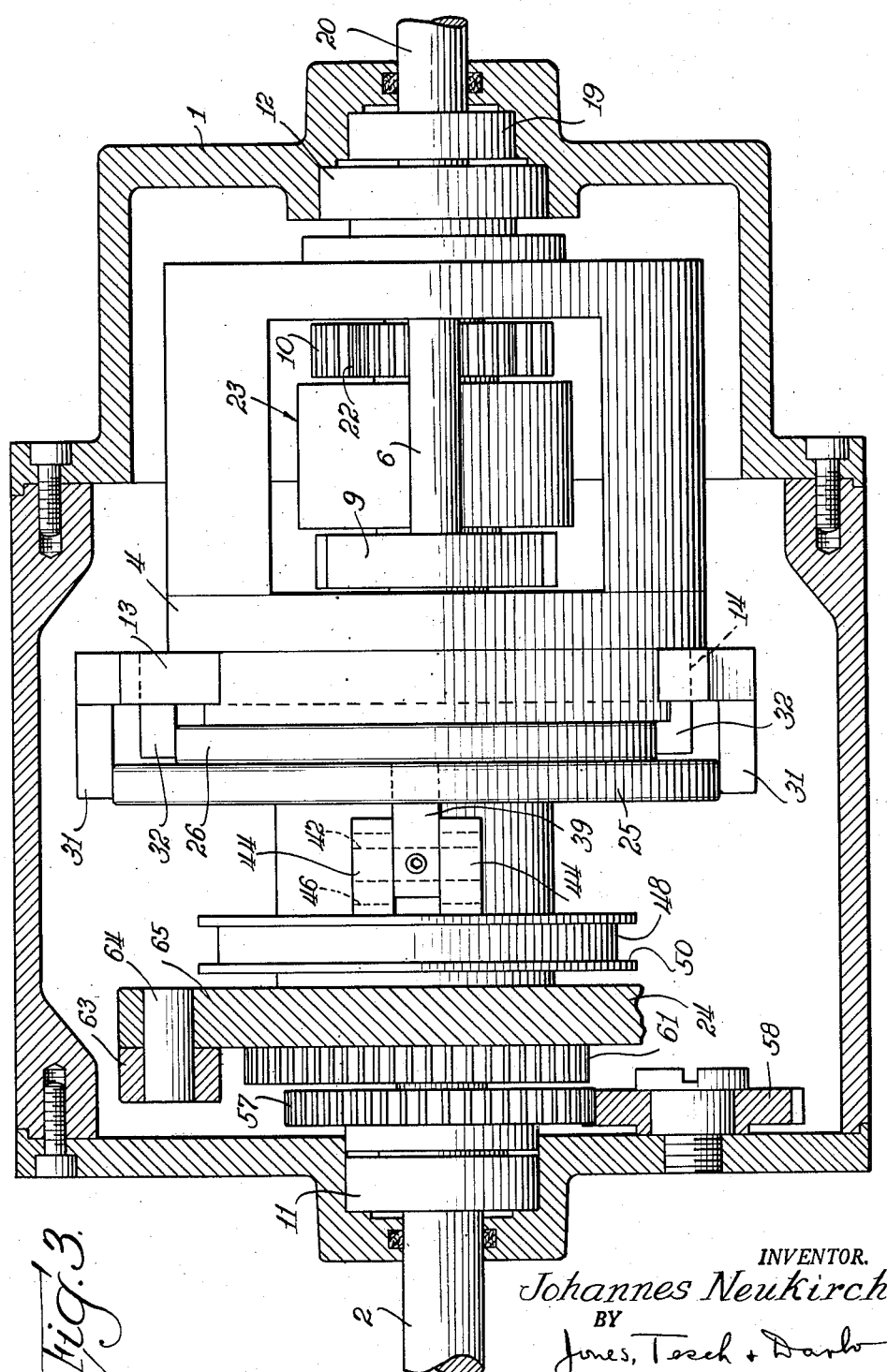
Fig. 3 is a cross-sectional view taken at the line 3—3 of Fig. 2.
Figure 4:
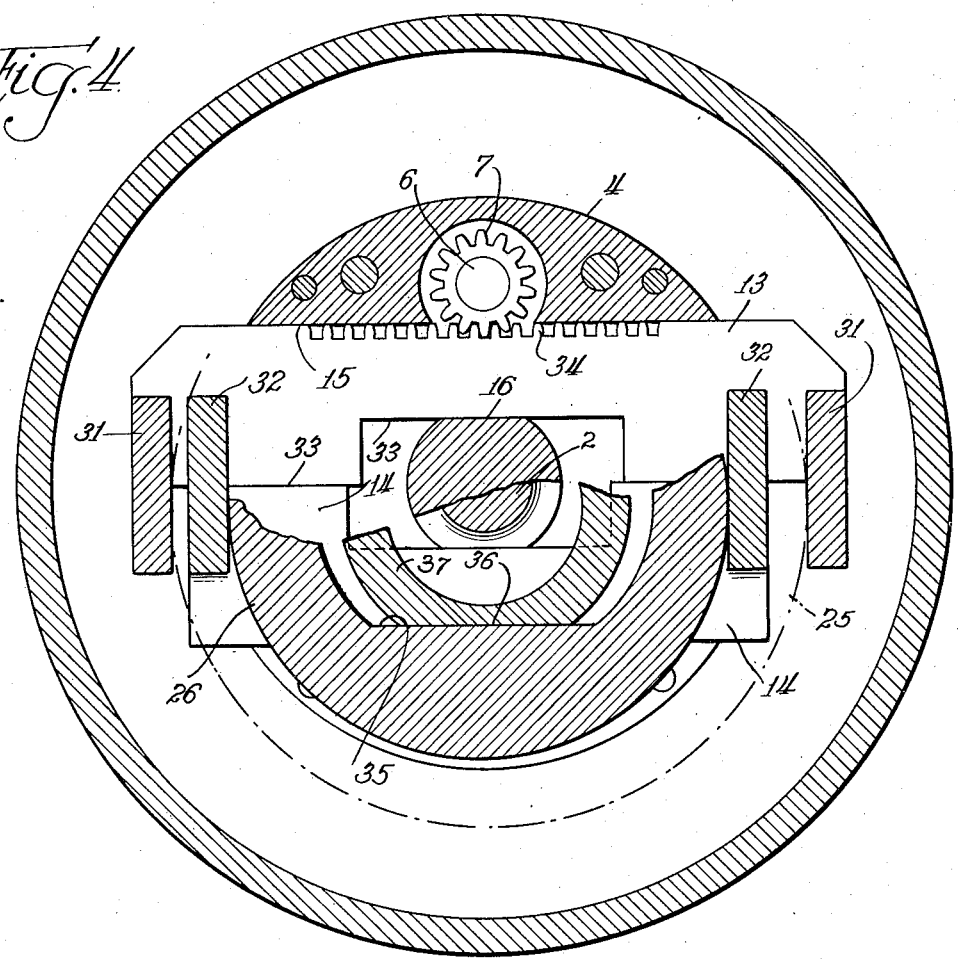
Fig. 4 is a vertical section taken at the line 4—4 of Fig. 1.

As is best seen in Figs. 3 and 4, racks 13 and 14 are provided respectively with cam follower flanges 31 and 32 which project at right angles from the ends of the racks. These laterally projecting elements provide relatively wide flat inner surfaces for engagement with the peripheries, respectively, of plates 25 and 26, the distances between the follower inner surfaces for each rack being equal to the outside diameter of the plate with which it operates. Flat slide surfaces 33 are provided along the edges of the racks remote from teeth 34 to slide upon the flats 16 of the drive shaft or the engaging surface of the other rack. Clearance is provided to permit reciprocation of the racks.

Plates 25 and 26 are provided with slots 35 the side edges of which engage flats 36 milled upon a boss at the inner extremity of sleeve 37. A retainer ring 38 holds the plates in position. With this arrangement, limited radial movement of the plates is permitted but the plates are rotated with sleeve 23. Ears 39 and 40 project laterally from plates 26 and 25, respectively, clearance being provided in plate 25 at 41 for the ear 39. The purpose of ears 39 and 40 is to fix the eccentricity of plates 25 and 26 with respect to sleeve 37. Pins 42 and 43 are fixed transversely in ears 39 and 40 near the extremities thereof. A pair of bifurcated yokes 44 and 45 having inclined slots 46 and 47 therein project laterally at diametrically opposite locations from ring 48 to cooperate with the ear and pin assemblies of plates 25 and 26 to control the eccentricities thereof. Ring 48 may rotate freely upon cylindrical flange 49 of bell crank 24. It is provided with a peripheral groove 50 into which a pin 51 extending laterally from slide bar 52 projects. Ring 48 may be shifted in an axial direction upon cylindrical flange 49 by shifting the position of slide bar 52, pin 51 and groove 50 cooperating to move ring 48 to correspond with the position of bar 52. Due to the inclination of slots 46 and 47, plates 25 and 26 are shifted radially with any shift in the position of ring 48.

Slide bar 52 is free to slide lengthwise in a slot 53 provided in a part of the bell crank 24. A second pin 54 extends in the opposite direction from that of pin 51 at the opposite end of bar 52. As is best shown in the detailed view of Fig. 5, pin 54 extends into a cam track 55 formed at an angle to the axis of drive shaft 2, as shown, in a block 56 which is fixed with respect to the transmission housing. With this arrangement, any angular movement of the bell crank 24, which carries the entire pinion drive mechanism, will cause a corresponding movement of slide bar 52 in response to the shifting of pin 54 in cam track 55. The net result of any such angular movement of bell crank 24 is a shifting of the location of the axis of sleeve 37 with respect to the axis of input shaft 2 and a related radial shifting of plates 25 and 26 to alter their eccentricity with respect to the axis of sleeve 37. For reasons hereinafter more fully explained, the mechanism is so designed that the ratio of the eccentricity of the axis of sleeve 37 with respect to the drive shaft axis to the eccentricity of each of plates 25 and 26 with respect to the axis of sleeve 37 is 1 to 5.

Sleeve 37 and the parts associated for rotation therewith, including plates 25 and 26 and control ring 48, is rotated at the same speed as that of input shaft 2 but in the opposite direction. Such rotation is brought about by a train of gears including gear 57 keyed to the drive shaft, an idler gear 58, a double gear 59, 60 rotating as a unit around shaft 28, and a gear 61 meshed with gear 60 and fixed upon the end of sleeve 37. This arrangement of gears permits angular movement of bell crank 24 about shaft 28 without interference from, or disengagement of, any of the gears of the train. The angular position of bell crank 24 is controlled by hand wheel 62 and threaded shaft 63 which is attached by suitable means, including a pin 64 to an ear 65 forming a part of the bell crank.

Operation of the transmission so described is as follows: Rotation of input shaft 2 by, for example, a prime mover, results in the rotation of the entire planetary gear assembly and the output shaft 20 as a whole. In addition, racks 13 and 14, rotating with the rotor plate 3 about the center of this plate which is coincidental with the axis of input shaft 2, results in the individual reciprocation of the racks corresponding to radial movement of the follower flanges 31 and 32 of the racks as the inside surfaces follow the peripheral surfaces of plates 25 and 26. While, due to the eccentricity of the driving plates, the racks move sidewise with respect to the centers of the plates, the inside surfaces of flanges 31 and 32 are always tangent to the peripheries of plates 25 and 26, respectively, so that reciprocation of the racks follows the tangent of the plates normal to the racks at all times. The significance of this relationship will be explained below.

Since the plates 25 and 26 are eccentric with respect to the axis of sleeve 37, the centers of the plates follow a circular orbit as the plates revolve as a body around the axis of sleeve 37. Revolution of racks 13 and 14 being, at all times, about the axis of input shaft 2, the eccentricity of sleeve 37 with respect to the axis of input shaft 2, as well as the eccentricity of the plates 25 and 26, influences the character of the reciprocating motion of the racks. With the mechanism of the invention, as described, each rack, alternately, moves at a uniform velocity throughout a full 180 degrees of rotation of the input shaft and planetary system, the rack being returned to its starting position during the remainder of the cycle. The uniform rotation of the individual planet pinion resulting from the uniform movement of its associated rack during the half-cycle or half turn of the input shaft is transmitted to the output shaft through the associated clutch element, the resulting speed of output shaft 20 being the sum of the speed of rotation of the planetary system as a whole and the rotation of the individual pinion. The two clutches alternate in coupling the gear system with the driven shaft, one taking over from the other at the end of each half turn of the input shaft, to continuously transmit the uniform drive motion.

A more thorough understanding of the manner in which the transmission of the invention delivers a uniform speed at the output shaft when operating at speed ratios other than unity (as well as at unity) will result from a consideration of the diagrammatic illustrations and graphs of Figs. 8–14.

Considering, first, the diagrammatic illustration of Fig. 8 and its associated graph in Fig. 9, the lines $a$—$b$, represent a radially slidable rack, such as racks 13 and 14, rotating about a point $e$ eccentric with respect to the center $r$ of a circular track. The end $b$ of the rack follows the circular track as it rotates in the direction of the arrow. If the displacement of a given point upon the rack, say the end $a$, for convenience, with respect to the center of rotation $e$ is plotted against degrees of rotation, the graph of Fig. 9 results. The displacement of the end *a* at zero degrees is zero, that at 180 degrees is equal to double the amount of the eccentricity *e—r*, and the displacement at 90 degrees is substantially greater than the eccentricity. Since the velocity at any angular position is equal to the slope of the graph at that point, it is apparent that the velocity of rack *a—b* in reciprocation is non-uniform. The average velocity is indicated by the straight line shown in this graph.

If, now instead of following a circular track as in Fig. 8, the rack *a—b* follows a line normal to it and which is always tangent to the circular track, as illustrated in Fig. 10, the displacement graph appears as shown in Fig. 11. As will be seen, the displacement at 90 degrees is equal to the amount of eccentricity *e—r* and that at 180 degrees, as in the graph of Fig. 8, is equal to twice this amount. While the velocity of the rack in reciprocation is still non-uniform, a degree of symmetry has been achieved, this being the first step in the development of the movement of the invention.

The five diagrammatic illustration of Fig. 12 demonstrate the movement of the actual invention as above described. The graph of Fig. 13, comparable to those of Figs. 9 and 11, represents the displacement and velocity of the rack.

Referring in detail to the several illustrations of Fig. 12, the light circle *c* represents the planet pinion carrier 4 and rotor 3, the axis of these elements being at the center *d*. This structure, carrying rack 13 and its associated pinion 7, represented in the illustration by the rectangular and associated circular elements, respectively, rotate about the center *d* in a counterclockwise direction as indicated by the arrow in one of the illustrations. The rack is provided at both ends with diagrammatic representations of followers 31 which are always tangential to the periphery of a cam plate represented by the heavy circle *f*. This cam plate revolves in a clockwise direction in an orbital path *g* about the center *h* representing the axis of sleeve 37. The dotted circle, having its center at *h* is provided for reference purposes.

As the rack and its associated pinion revolve in a counterclockwise direction, and the cam plate revolves in its orbit in a clockwise direction as indicated by an arrow, the rack is displaced in consequence of the movement of the followers along the periphery of the eccentric cam plate. The magnitude of this displacement is indicated at five different angular positions of one-half cycle (one-half turn of the input shaft) and is the distance along the rack from the starting point of contact of the pinion, indicated by the letter *i*, to the instant point of conact. This displacement of the rack and the corresponding rotation of the associated pinion are indicated by arrows in one of the illustrations. The magnitude of the displacement for each position illustrated is plotted against degrees of rotation in the graph of Fig. 13. The result is a straight line indicating uniform displacement and constant velocity throughout the entire span of the one-half cycle of rotation of the system. This is the working stroke of the rack which results in the uniform rotation of the planet pinion around its own axis which, in turn, results in a uniform rotation of the output shaft of the transmission.

For clarity, only a single rack and its associated pinion is shown in the illustration of Fig. 12. During the one-half cycle succeeding that illustrated, the rack shown returns (with non-uniform displacement and velocity) to its starting position. During this return stroke, the second rack takes over and serves as the uniform drive for the second pinion and thence the output shaft. This transfer of the driving load from one rack to the other takes place automatically if overriding clutches are used or may be accomplished by positively controlled clutches.

The nature of this cooperation between the two racks and the return strokes is graphically illustrated in Fig. 14. In this graph, the solid line represents the displacement (and the slope thereof the velocity) of the first rack; the dotted line represents the displacement (and velocity) of the second rack. A characteristic of the movement of the invention which is of great importance to the smooth operation of the transmission is illustrated in this graph. The straight line rising from zero to maximum displacement at 180 degrees of rotation of the input shaft corresponds to the straight line of Fig. 13. Continuing the progress of this line, it will be noted that the direction of displacement and the velocity continue for a substantial interval beyond the half-cycle that is the working stroke of the first rack. During this interval, the displacement and velocity of the second rack is the same as that of the first rack. It is at this point that the clutch associated with the gear path of the second rack takes over, relieving the clutch associated with the first rack, the changeover being smooth and without wear and tear on the mechanical parts. During the working stroke of the second rack, the first rack returns to its starting position, and in turn, takes over smoothly from the second rack at the beginning of the second cycle of the system.

The many advantages of the invention will be apparent to those familiar with the many attempts to achieve simple, smoothly operating transmissions which are capable of efficient transmission of power at a stepless variety of speed ratios. The efficiency of continuous positive engagement is retained while the many advantages of, for example, the hydraulic drives are also realized.

Because the single example of the invention described herein in detail sets forth fully the principles and mechanical movements involved, no attempt is made to detail the many possible equivalent variants that may be used. Those skilled in the art are well aware that any of a number of different types of clutch may be used, for example, and any of such alternative forms and arrangements may be employed without departing from the concept of the invention.

Invention is claimed as follows:

1. A mechanism for driving a planet pinion of a planetary gear system with uniform velocity of rotation over one-half of one cycle of said system comprising a pinion carrier and a pinion carried thereby in revolution about the axis of said system, a circular cam plate having an axis parallel with that of said carrier, a rack meshing with said pinion, cam follower means fixedly associated with said rack and having flat follower faces normal to said rack and tangentially engaging the periphery of said cam plate at diametrically opposite positions thereon, means for rotating said rack about the axis of said planetary system in the same direction and at the same speed as that of said carrier, and means for revolving said cam plate in a circular orbit about an axis which is eccentric with respect to the axis of said planetary system in a direction opposite to that of said carrier and at the same speed as that of said carrier.

2. The mechanism of claim 1 wherein the ratio of the radius of the circular orbit to the eccentricity of the axis of said orbit with respect to the axis of the planetary system is 1 to 5.

3. The mechanism of claim 1 and including means for simultaneously controlling the radius of the circular orbit and the eccentricity of the axis of said orbit with respect to the axis of the planetary system.

4. The mechanism of claim 1 wherein the means for revolving the rack comprises a rotor coaxial with and fixed to the pinion carrier and having a slideway accommodating said rack therein.

5. Structure in accordance with claim 1 wherein the means for revolving the cam plate in a circular orbit comprises a rotatable cylindrical sleeve surrounding the input shaft of the planetary system in eccentric parallel relation thereto, and gear means coupling said input shaft with said sleeve, said sleeve being coupled with said cam plate against rotation relative thereof.

6. A mechanism for alternatively driving each of two planet pinions of a planetary gear system with uniform velocity of rotation over one-half of one cycle of said system comprising a pinion carrier and a pair of pinions carried thereby in revolution about the axis of said system, a pair of circular cam plates eccentric with respect to a reference axis located midway between the centers of said cam plates and eccentric with respect to the axis of said system, a pair of parallel racks each meshing with one of said pinions, cam follower means fixedly associated with each said rack and having flat follower faces normal to the rack and tangentially engaging the periphery of one of said cam plates at diametrically opposite positions thereon, means for rotating said racks about the axis of said planetary system in the same direction and at the same speed as that of said carrier, and means for revolving said cam plates in a circular orbit about said reference axis in a direction opposite to that of said carrier and at the same speed as that of said carrier.

7. In a variable speed transmission including in operative relationship an input shaft, a planetary gear system having a planet pinion, and an output shaft, in combination, a rotatable cylindrical sleeve surrounding said input shaft in eccentric parallel relation thereto, said sleeve having external parallel flats thereon, gear means for driving said sleeve in rotation at the same speed as but in the opposite direction from that of said input shaft, a circular cam plate having a diametrical slot therein mounted upon said sleeve with said flats cooperating with said slots to prevent rotation of said sleeve with respect to said plate while permitting diametrical movement of said plate upon said sleeve, means for controlling the eccentricity of said cam plate with respect to said sleeve, a rack meshing with the planet pinion and having follower flanges extending laterally from the ends thereof in following engagement with diametrically opposite points upon the periphery of said cam plate, means for rotating said rack about the axis of said input shaft in the same direction and at the same speed as that of said input shaft, and clutch means for operatively coupling the planet pinion with the output shaft of the planetary system during one-half of each cycle of the input shaft.

8. Structure in accordance with claim 7 and including means for controlling the eccentricity of said sleeve with respect to said input shaft.

9. Structure in accordance with claim 8 wherein the means for controlling the eccentricity of the cam plate with respect to said sleeve and the means for controlling the eccentricity of said sleeve with respect to said input shaft are mechanically coupled whereby the ratio of said eccentricities is maintained at a constant value.

10. In a variable speed transmission including in operative relationship an input shaft, a planetary gear system having a first and a second planet pinion, and an output shaft, in combination, a first circular transverse cam plate eccentric with respect to a reference axis which is eccentric to the axis of said input shaft, a second circular transverse cam plate eccentric with respect to said reference axis to the same degree as but in opposite direction to the eccentricity of said first cam plate, a first rack meshing with the first planet pinion and having follower flanges extending laterally from the ends thereof in following engagement with diametrically opposite points upon the periphery of said first cam plate, a second rack meshing with the second planet pinion and having follower flanges extending laterally from the ends thereof in following engagement with diametrically opposite points upon the periphery of said second cam plate, means for rotating said racks about the axis of said input shaft in the same direction and at the same speed as that of said input shaft, means for revolving said cam plates about said reference axis in a direction opposite to that of said input shaft and at the same speed as that of said input shaft, said reference axis being eccentric with respect to the axis of said input shaft, and clutch means for intermittently coupling the first and second planet pinions with said output shaft during alternate one-half cycles of each cycle of the input shaft.

11. Structure in accordance with claim 10 wherein the means for revolving the cam plates about the reference axis comprises a rotatable cylindrical sleeve surrounding said input shaft and coaxial with the reference axis, and gear means coupling said input shaft with said sleeve, said sleeve being coupled with said cam plates against rotation relative thereto.

12. In a variable speed transmission including in operative relationship an input shaft, a planetary gear system including a pair of planet pinions, and an output shaft, in combination, a rotatable cylindrical sleeve surrounding said input shaft in eccentric parallel relation thereto, said sleeve having external parallel flats thereon, gear means for driving said sleeve in rotation at the same speed as but in the opposite direction from that of said input shaft, a pair of circular cam plates each having a diametrical slot therein and both mounted upon said sleeve with said flats cooperating with said slots to prevent rotation of said sleeve with respect to said plates while permitting diametrical movement of each plate upon said sleeve, means for controlling the eccentricity of said cam plates with respect to said sleeve, a pair of racks each meshing with a planet pinion and having follower flanges extending laterally from the ends thereof in tangential following engagement with diametrically opposite points upon the periphery of one of said cam plates, means for rotating said racks about the axis of said input shaft in the same direction and at the same speed as that of said input shaft, and clutch means for alternately coupling the planet pinions with said output shaft during one-half of each cycle of the input shaft.

13. Structure in accordance with claim 12 and including means for controlling the eccentricity of said sleeve with respect to said input shaft.

14. Structure in accordance with claim 12 wherein the means for controlling the eccentricity of the cam plates with respect to said sleeve and the means for controlling the eccentricity of said sleeve with respect to said input shaft are mechanically coupled and maintained a constant ratio of said eccentricities of 5 to 1.

15. Structure in accordance with claim 12 wherein said planetary gear system includes a pair of sun gears journalled upon the output shaft and each is coupled to a planet pinion, and the clutch means comprises a pair of overriding clutch units, each clutch unit being operatively inserted between a sun gear and said output shaft.

16. In a variable speed transmission including a housing, an input shaft and an output shaft journaled in said housing and a planetary gear system coupling said input and output shafts, in combination, a pivot shaft mounted in said housing in spaced parallel relation to said input shaft, a bell crank pivotally mounted upon said pivot shaft, a cylindrical sleeve rotatably so mounted upon said bell crank that said sleeve is coaxial with said input shaft at one angular position of said bell crank, gear means for driving said sleeve at the same speed as but in the opposite direction from that of said input shaft, a pair of circular cam plates mounted upon said sleeve for rotation therewith but movable with respect thereto in the direction of one diameter thereof, means responding to the angular position of said bell crank for controlling the eccentricity of each cam plate with respect to said sleeve and the eccentricity of said sleeve with respect to said input shaft and maintaining the ratio of said eccentricities at a constant value, a pair of racks each meshing with a planet pinion and having follower flanges extending laterally from the ends thereof in following engagement with diametrically opposite points upon the periphery of one of said cam plates, means for rotating said racks about the axis of said input shaft in the same direction and at the same speed as that of said input shaft, and clutch and gear means for alternately coupling the planet pinions with said output shaft during alternate one-half cycles of each cycle of the input shaft.

17. Structure in accordance with claim 16 wherein the gear means for driving the sleeve comprises a gear keyed upon the input shaft, a gear keyed upon said sleeve, a gear journaled upon the pivot shaft and meshing with said gear keyed to said sleeve, and an idler gear supported by the housing and meshing with said gear keyed upon said input shaft and said gear journaled upon said pivot shaft.

18. Structure in accordance with claim 16 wherein the means for controlling the eccentricity of each cam plate with respect to the sleeve and the eccentricity of the sleeve with respect to the input shaft comprises a peripherally grooved ring mounted upon the bell crank for free rotation and axial movement thereon with respect to the axis of the sleeve, a bifurcated yoke extending laterally from said ring at diametrically opposite points thereof and having inclined slots in the arms of said yoke, a lug extending laterally from each cam plate into an associated one of said yokes, a pin extending transversely through each said lug and the inclined slots of the arms of the associated yoke, and cam means for translating angular displacement of said bell crank into axial displacement of said ring.

19. Structure in accordance with claim 11 wherein said means for rotating the racks about the reference axis comprises a rotor fixed to said shaft and having a groove in the face thereof accommodating said racks for guiding said racks in reciprocation.

References Cited in the file of this patent
UNITED STATES PATENTS

| | | |
|---|---|---|
| 309,722 | Maertens | Dec. 23, 1884 |
| 1,268,140 | Nagel | June 4, 1918 |
| 1,509,472 | Carey | Sept. 23, 1924 |
| 1,818,407 | Laille | Aug. 11, 1931 |
| 2,256,903 | Joyner et al. | Sept. 23, 1941 |
| 2,387,401 | Marco | Oct. 23, 1945 |

FOREIGN PATENTS

| | | |
|---|---|---|
| 449,460 | France | Feb. 27, 1913 |